United States Patent [19]

Alcanzare

[11] 4,188,060
[45] Feb. 12, 1980

[54] COMBAT AND TRANSPORT VEHICLE BODY

[76] Inventor: Eduardo V. Alcanzare, Angeles City, Philippines

[21] Appl. No.: 942,480

[22] Filed: Sep. 15, 1978

[30] Foreign Application Priority Data

May 25, 1978 [PH] Philippines .............................. 21192

[51] Int. Cl.² .............................................. B60N 1/00
[52] U.S. Cl. ....................................... 296/63; 296/67; 297/92
[58] Field of Search .................. 296/63, 19, 20, 65 R, 296/66, 67; 297/92, 93, 94

[56] References Cited

U.S. PATENT DOCUMENTS 2,704,989  3/1955  Konecny .............................. 296/19

FOREIGN PATENT DOCUMENTS 1001252  8/1965  United Kingdom ...................... 296/19

Primary Examiner—Philip Goodman
Attorney, Agent, or Firm—Bucknam and Archer

[57] ABSTRACT

A vehicle body having a floor, vertical outer rear posts and front posts which are aligned along the longitudinal sides of said floor, rear inner rear posts spaced inwardly of said rear outer posts, a front transverse wall connected to said front posts, a pair of longitudinal seat frames, each pivotally connected to a corresponding rear inner post and to said front wall, and a corresponding longitudinal side wall hingedly connected to the longitudinal side of said seat frame.

3 Claims, 3 Drawing Figures

COMBAT AND TRANSPORT VEHICLE BODY

This invention relates in general to motor vehicles and more particularly to a motor vehicle body having a pair of identical longitudinally disposed tiltable seat and wall assemblies which allow the occupants to be seated face to face, when traveling long distances in safe areas, or back to back and facing the open sides of the vehicles for fast dismounting from the vehicles when traveling through combat areas.

Heretofore, motor vehicles specially those used for transporting combat personnel have bodies which have fixed side walls and seats, such that the personnel are seated face to face. This arrangement is rather disadvantageous in that in cases of emergency, such as in ambushes, the personnel could not quickly dismount to take over or defensive positions.

The main object then of this invention is to provide a motor vehicle body having a pair of tiltable seat and wall assemblies disposed longitudinally along the sides of said body whereby the seats could be arranged or positioned such that the occupants would either be seated face to face each other, or back to back facing the open sides of the motor vehicle body.

Another object is to provide a motor vehicle with a very simple seat and wall assembly which could be easily converted to have the passengers seated either face to face or back to back each other.

These objects will be easily comprehended after studying the following detailed description of the appended drawings, wherein.

Figure 1:
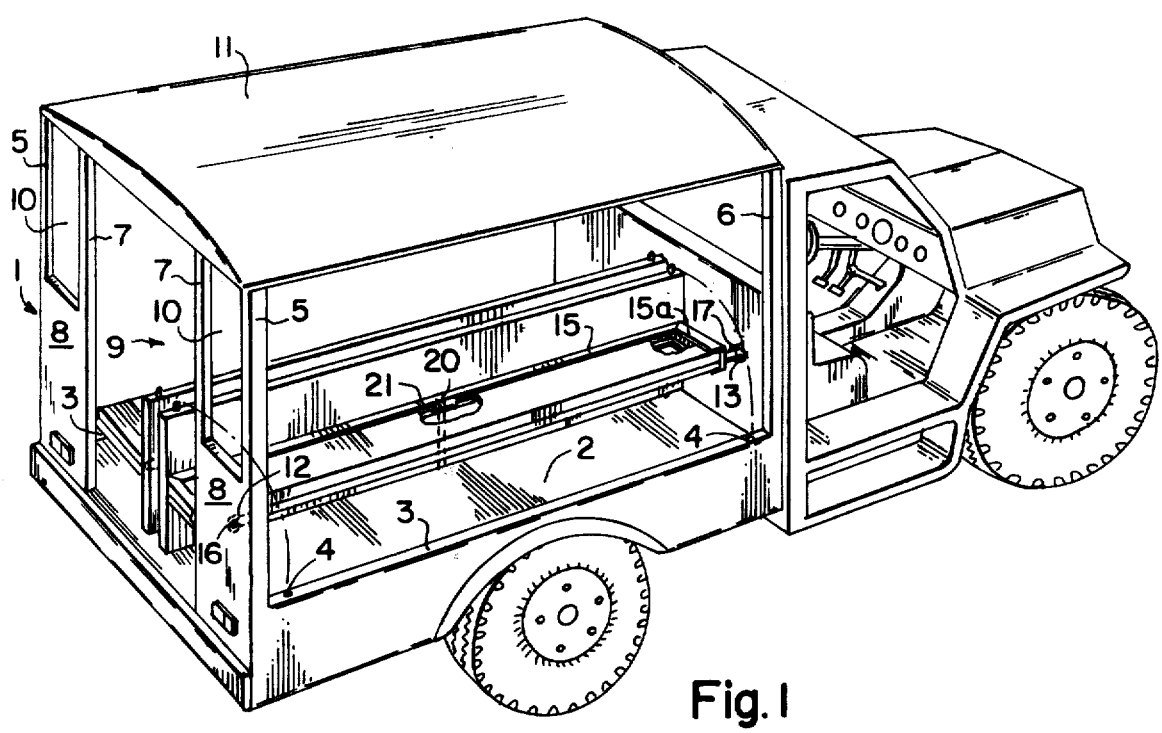
FIG. 1 is a perspective view of this combat and transport motor vehicle body when mounted in a lightweight motor vehicle.

With reference to the drawings, this combat and transport motor vehicle body 1 has a floor section 2 having upwardly offset longitudinal side members 3, with holes 4 at front and rear ends thereof, outer rear and front vertical posts 5 and 6, inner rear posts 7, rear walls 8, rear opening 9 between said rear inner posts, rear windows 10 and a roof 11.

Figure 2:
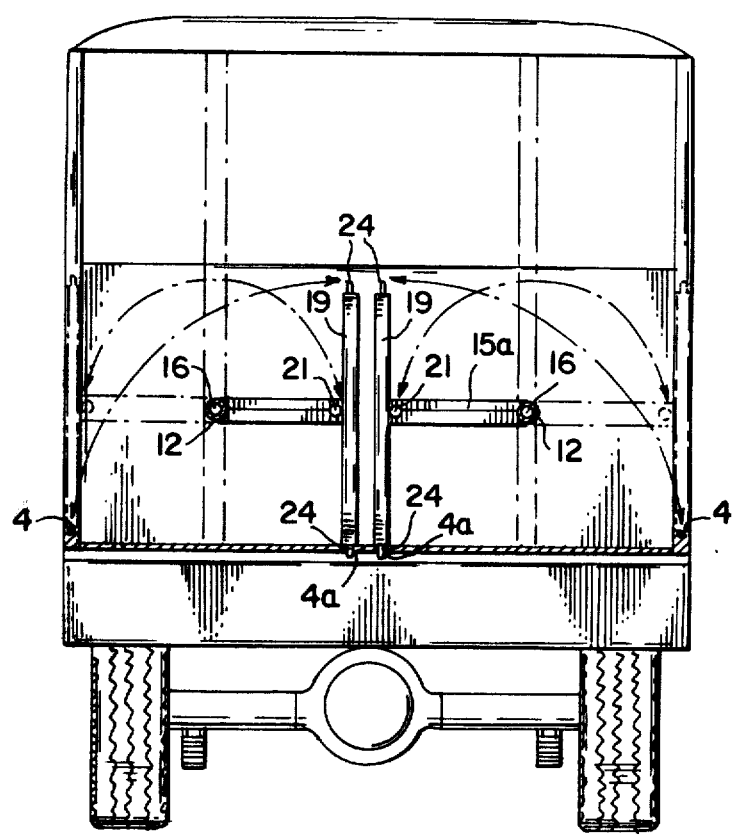
FIG. 2 is a rear view thereof with the floor sectioned.

Pivotally connected to the inner rear post and the front wall on suitable bushings 12 and 13, respectively, are the ends of the transverse sides of the seat frames 15 which have rearwardly and forwardly extending pins 16 and 17 which are rotably fitted into the bushings 12 and 13. At the longitudinally side 18 of said seat frame is hingedly connected the side wall 19 which has several spaced bushings 20 welded thereto and in line with corresponding bushings (not shown) welded to the longitudinal side of said seat frame. Inserted or threaded through said bushings, is an elongated rod 21. At the opposed longitudinal sides 22 and 23 of the side wall 19 are lugs 24 which fit into corresponding holes 4 provided at the sides of the floor and holes 4a inwardly from the sides and preferably longitudinally in line with the corresponding inner posts. As in FIG. 2, the seat and side wall assemblies could be rotated in the direction of the arrows A so that the side walls could either be in line with the outer rear and front posts at the longitudinal sides of the floor or at the middle portion of the floor, with the seat being correspondingly moved inwardly to face the open sides of the motor vehicle body.

Figure 3:
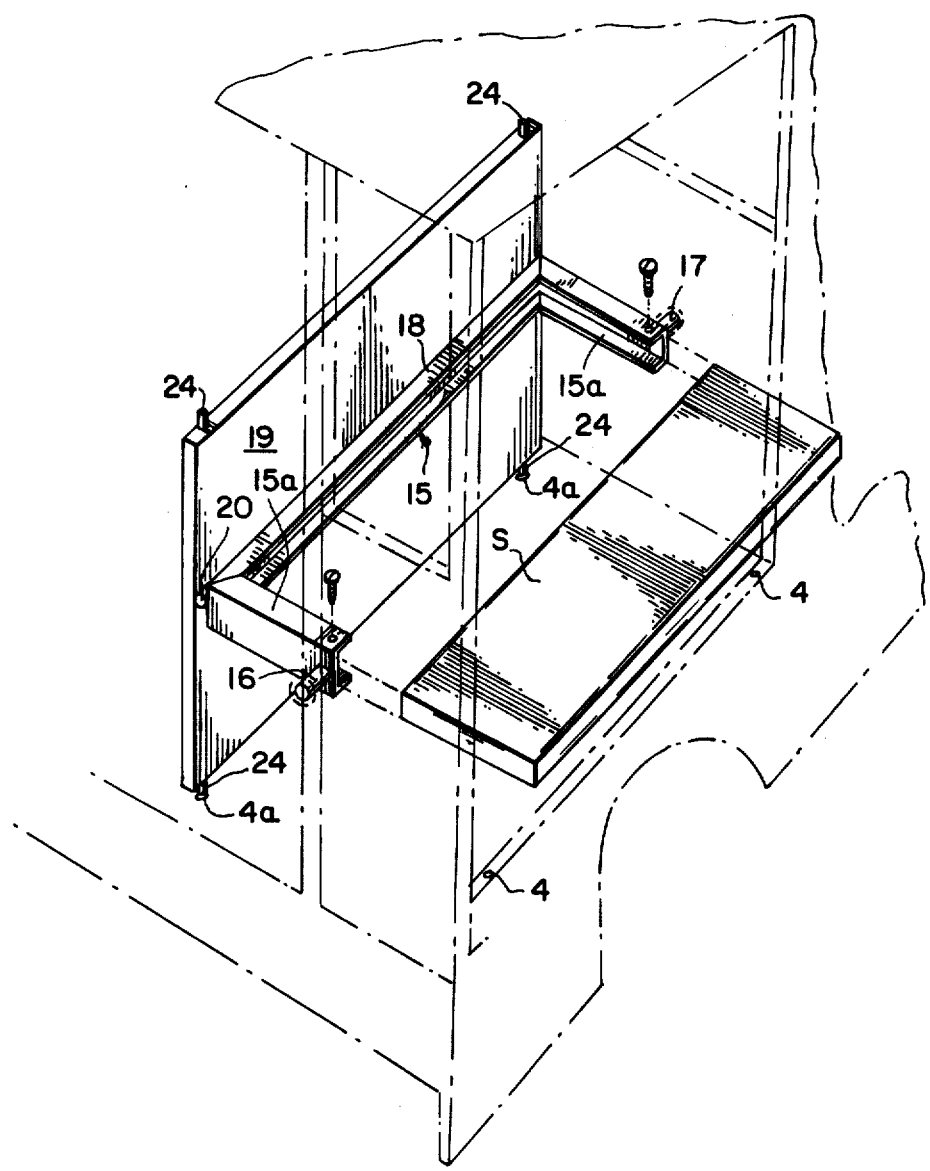
FIG. 3 is an exploded view of the seat and wall assembly of this combat and transport vehicle body.

As shown in FIG. 3, the slot frame 15 is made of channel shaped members 15a with one of the longitudinal sides open to detachably receive a seat proper S. If much load is to be carried when the seats are disposed inwardly, the seat proper is simply detached from the frame by unscrewing the retainer screws 25 at the corners 26 of the seat frame.

While this vehicle body would be very useful to the armed forces, including the police, it could also be conveniently used by repair and maintenance crews.

Various modifications may be easily made by those skilled in the art on the above exemplary embodiment without departing from the essence of the invention as defined in the appended claim.

I claim:

1. A vehicle body having a floor, vertical outer rear posts and front posts which are aligned along the longitudinal sides of said floor, rear inner rear posts spaced inwardly of said rear outer posts, a front transverse wall connected to said front posts, a pair of longitudinal seat frames, each pivotally connected to a corresponding rear inner post and to said front wall, and a corresponding longitudinal side wall hingedly connected to the longitudinal side of said seat frame.

2. A motor vehicle body as defined in claim 1, wherein said longitudinal side walls has at least a pair of lugs on the opposed longitudinal sides thereof which fit into corresponding holes provided at the middle and side of said floor.

3. A motor vehicle body as defined in claim 1, wherein said seat frame has one open longitudinal side wherein a seat proper could be detachably disposed.

* * * * *